(12) United States Patent
Hasenfratz et al.

(10) Patent No.: US 9,289,710 B2
(45) Date of Patent: Mar. 22, 2016

(54) FILTER ELEMENT AND AIR FILTER

(71) Applicant: MANN+HUMMEL GMBH, Ludwigsburg (DE)

(72) Inventors: Robert Hasenfratz, Waiblingen (DE); Fabian Wagner, Moeglingen (DE); André Roesgen, Remshalden (DE); Christian Thalmann, Speyer (DE); Frank Pflueger, Sachsenheim (DE); Werner Blossey, Benningen (DE); Pascal Neef, Renningen (DE); Mario Rieger, Ludwigsburg (DE); Nadine Sorger, Fellbach (DE); Andreas Weber, Freiberg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/494,200

(22) Filed: Sep. 23, 2014

(65) Prior Publication Data

US 2015/0007533 A1 Jan. 8, 2015

Related U.S. Application Data

(63) Continuation of application No. PCT/EP2013/056223, filed on Mar. 25, 2013.

(30) Foreign Application Priority Data

| Mar. 23, 2012 | (DE) | 10 2012 005 731 |
| Mar. 23, 2012 | (DE) | 10 2012 005 732 |
| Mar. 23, 2012 | (DE) | 10 2012 005 734 |

(51) Int. Cl.
*B01D 46/00* (2006.01)
*F01N 3/021* (2006.01)
(Continued)

(52) U.S. Cl.
CPC ........ *B01D 46/0039* (2013.01); *B01D 46/0006* (2013.01); *B01D 46/10* (2013.01); *B01D 46/2411* (2013.01); *F01N 3/021* (2013.01); *F02M 35/0203* (2013.01);
(Continued)

(58) Field of Classification Search
CPC .................................................. B01D 46/0005
USPC .......................................................... 55/467
See application file for complete search history.

(56) References Cited

U.S. PATENT DOCUMENTS

| 2,938,597 A | * | 5/1960 | Bolyai | 55/288 |
| 3,494,113 A | * | 2/1970 | Kinney | 55/481 |

(Continued)

FOREIGN PATENT DOCUMENTS

GB        1446195 A       8/1976

*Primary Examiner* — Amber R Orlando
*Assistant Examiner* — Britanny Precht
(74) *Attorney, Agent, or Firm* — James Hasselbeck

(57) ABSTRACT

A filter element has a filter bellows and at least one support element arranged on the filter bellows that supports the filter element relative to a filter housing in which the filter element is to be arranged. The at least one support element is arranged on at least one edge of the filter bellows and projects outwardly past the filter bellows. The at least one support element is detachably or non-detachably attached on the filter bellows directly or indirectly. The at least one support element is preferably arranged on a corner of the filter bellows and projects past all sides of the filter bellows adjoining the corner. An air filter with a filter housing is furnished with the filter element.

20 Claims, 5 Drawing Sheets

(51) Int. Cl.
*B01D 46/10* (2006.01)
*B01D 46/24* (2006.01)
*F02M 35/024* (2006.01)
*F02M 35/02* (2006.01)

(52) U.S. Cl.
CPC ... *F02M 35/02425* (2013.01); *B01D 2265/024* (2013.01); *B01D 2265/025* (2013.01); *B01D 2271/027* (2013.01); *B01D 2279/60* (2013.01)

(56) References Cited

U.S. PATENT DOCUMENTS

| | | | | |
|---|---|---|---|---|
| 3,793,813 A * | 2/1974 | McAllister | | 55/481 |
| 3,880,627 A * | 4/1975 | Morton | | 55/499 |
| 3,984,221 A * | 10/1976 | Cotton, Jr. | | 55/501 |
| 4,363,643 A * | 12/1982 | Elbrader et al. | | 55/499 |
| 4,746,339 A * | 5/1988 | Millard | | 55/302 |
| 4,925,469 A | 5/1990 | Clement | | |
| 5,509,950 A * | 4/1996 | van de Graaf et al. | | 55/486 |
| 5,863,310 A * | 1/1999 | Brown et al. | | 55/480 |
| 5,944,860 A * | 8/1999 | Mack et al. | | 55/492 |
| 5,993,519 A * | 11/1999 | Lim et al. | | 95/286 |
| 6,033,453 A * | 3/2000 | Weddell, III | | 55/493 |
| 6,059,852 A * | 5/2000 | Olson | | 55/495 |
| 6,126,707 A * | 10/2000 | Pitzen | | 55/495 |
| 6,149,701 A * | 11/2000 | Ellingson | | 55/493 |
| 6,152,980 A * | 11/2000 | Culwell | | 55/481 |
| 6,214,076 B1 * | 4/2001 | Beier et al. | | 55/484 |
| 6,461,396 B1 * | 10/2002 | Barker et al. | | 55/471 |
| 6,485,538 B1 * | 11/2002 | Toyoshima | | 55/490 |
| 6,780,217 B1 * | 8/2004 | Palmer | | 55/502 |
| 6,800,117 B2 * | 10/2004 | Barris et al. | | 95/273 |
| 7,048,346 B2 * | 5/2006 | Saravis | | 312/111 |
| 7,524,362 B2 * | 4/2009 | Wu et al. | | 96/15 |
| 7,905,936 B2 * | 3/2011 | Coulonvaux et al. | | 55/357 |
| 7,947,101 B2 * | 5/2011 | Devine et al. | | 55/484 |
| 8,163,057 B2 * | 4/2012 | Blossey et al. | | 55/503 |
| 8,182,570 B2 * | 5/2012 | Rieger | | 55/502 |
| 8,808,417 B2 | 8/2014 | Engelland et al. | | |
| 2002/0194824 A1 * | 12/2002 | Clayton et al. | | 55/482 |
| 2003/0070406 A1 * | 4/2003 | Duffy | | 55/497 |
| 2003/0177745 A1 * | 9/2003 | Jauw | | 55/497 |
| 2004/0112020 A1 * | 6/2004 | Wilson | | 55/385.3 |
| 2004/0154273 A1 * | 8/2004 | Stephan | | 55/495 |
| 2004/0172927 A1 * | 9/2004 | Lee | | 55/495 |
| 2004/0172928 A1 * | 9/2004 | Kubokawa | | 55/497 |
| 2004/0206058 A1 * | 10/2004 | Bugli et al. | | 55/385.3 |
| 2005/0005767 A1 * | 1/2005 | Gieseke et al. | | 95/273 |
| 2006/0261002 A1 | 11/2006 | Dworatzek et al. | | |
| 2007/0289265 A1 * | 12/2007 | Coulonvaux et al. | | 55/324 |
| 2008/0022641 A1 * | 1/2008 | Engelland et al. | | 55/521 |
| 2008/0216455 A1 * | 9/2008 | Aizawa et al. | | 55/481 |
| 2008/0250763 A1 * | 10/2008 | Widerski et al. | | 55/357 |
| 2009/0320686 A1 * | 12/2009 | Blossey et al. | | 96/188 |
| 2010/0170209 A1 * | 7/2010 | Nelson et al. | | 55/357 |
| 2010/0236204 A1 * | 9/2010 | Bouhanna et al. | | 55/494 |
| 2011/0173937 A1 * | 7/2011 | Nelson | | 55/497 |
| 2012/0311978 A1 * | 12/2012 | Crabtree et al. | | 55/385.2 |
| 2014/0318092 A1 * | 10/2014 | Rieger et al. | | 55/511 |

* cited by examiner

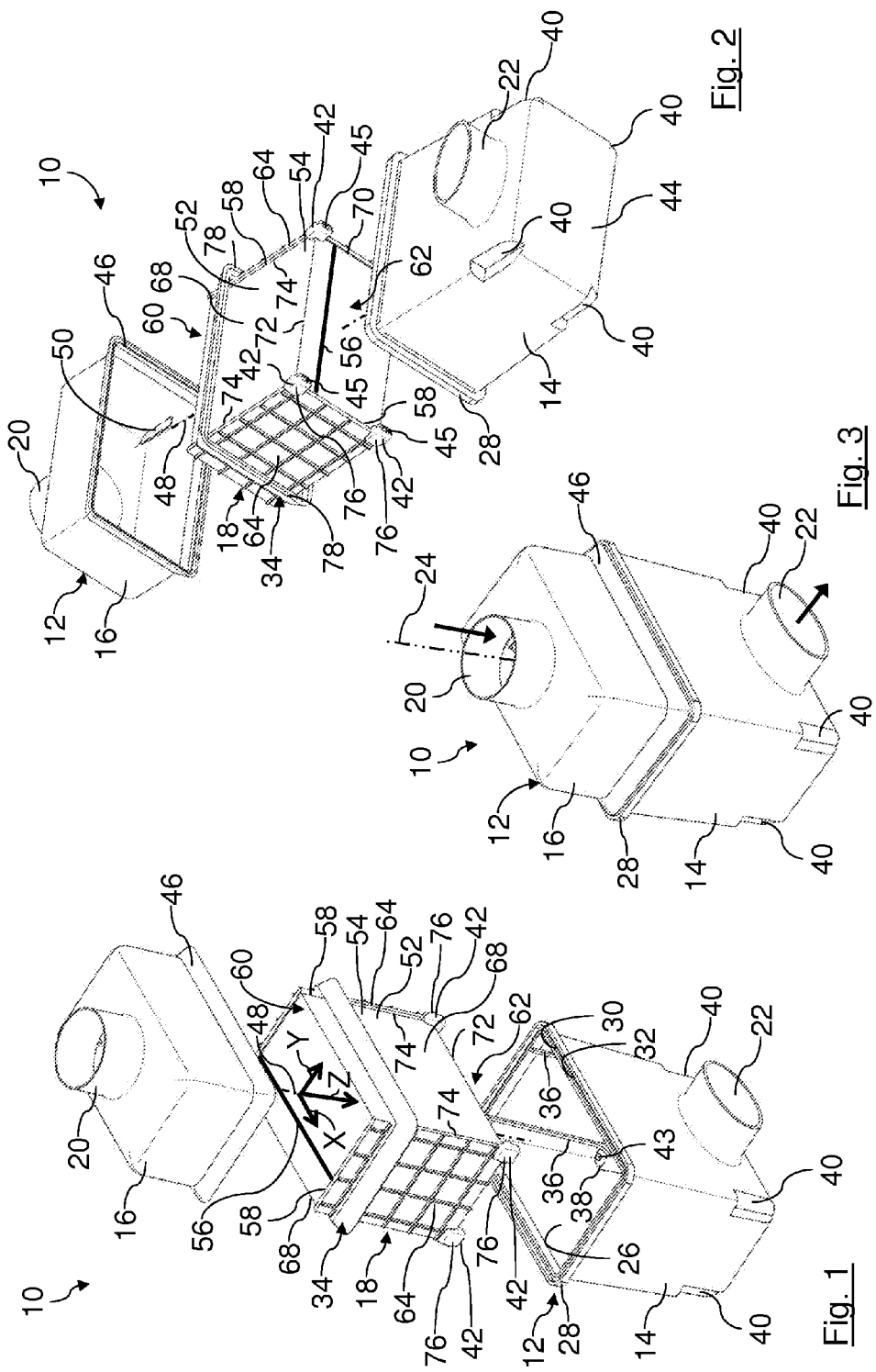

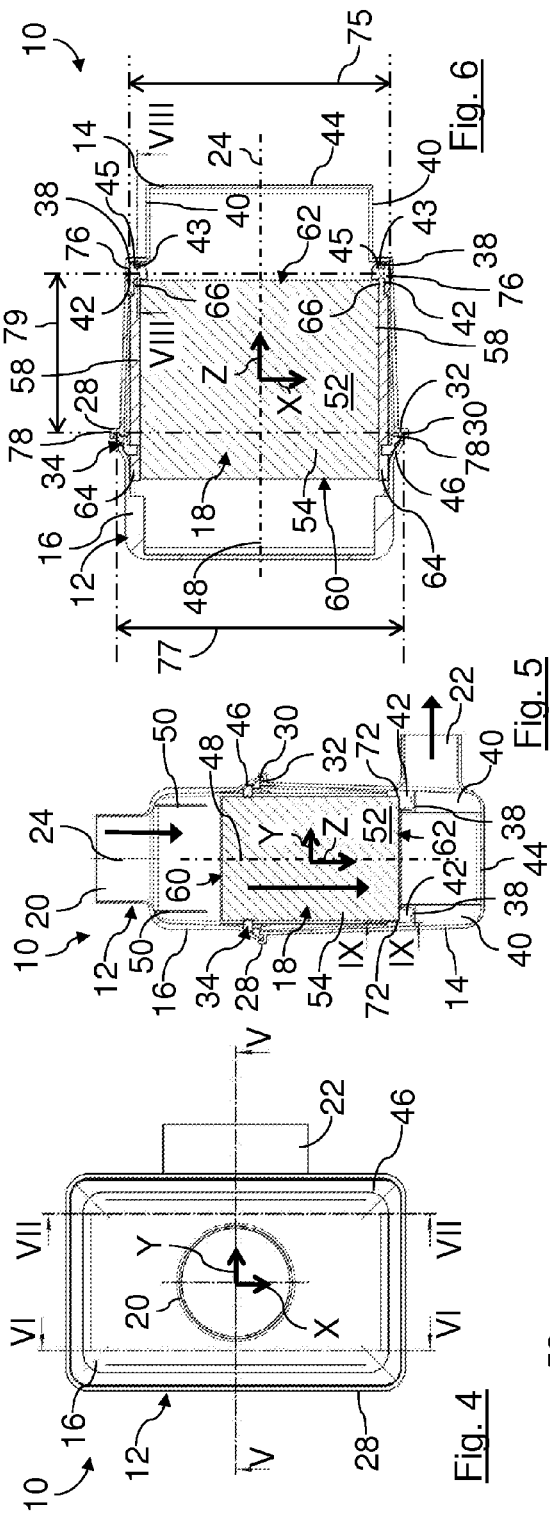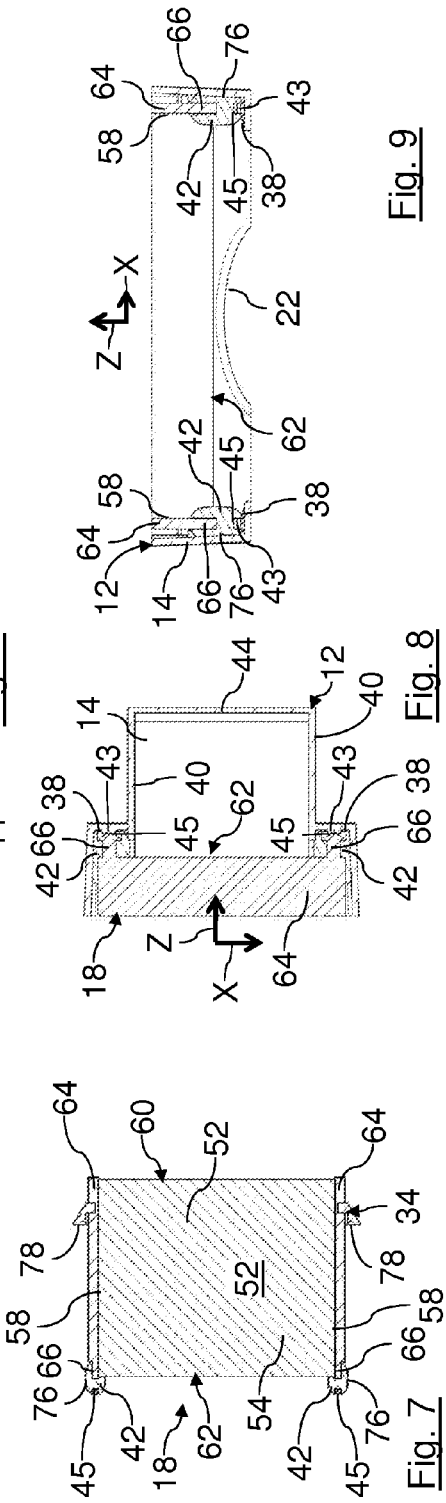

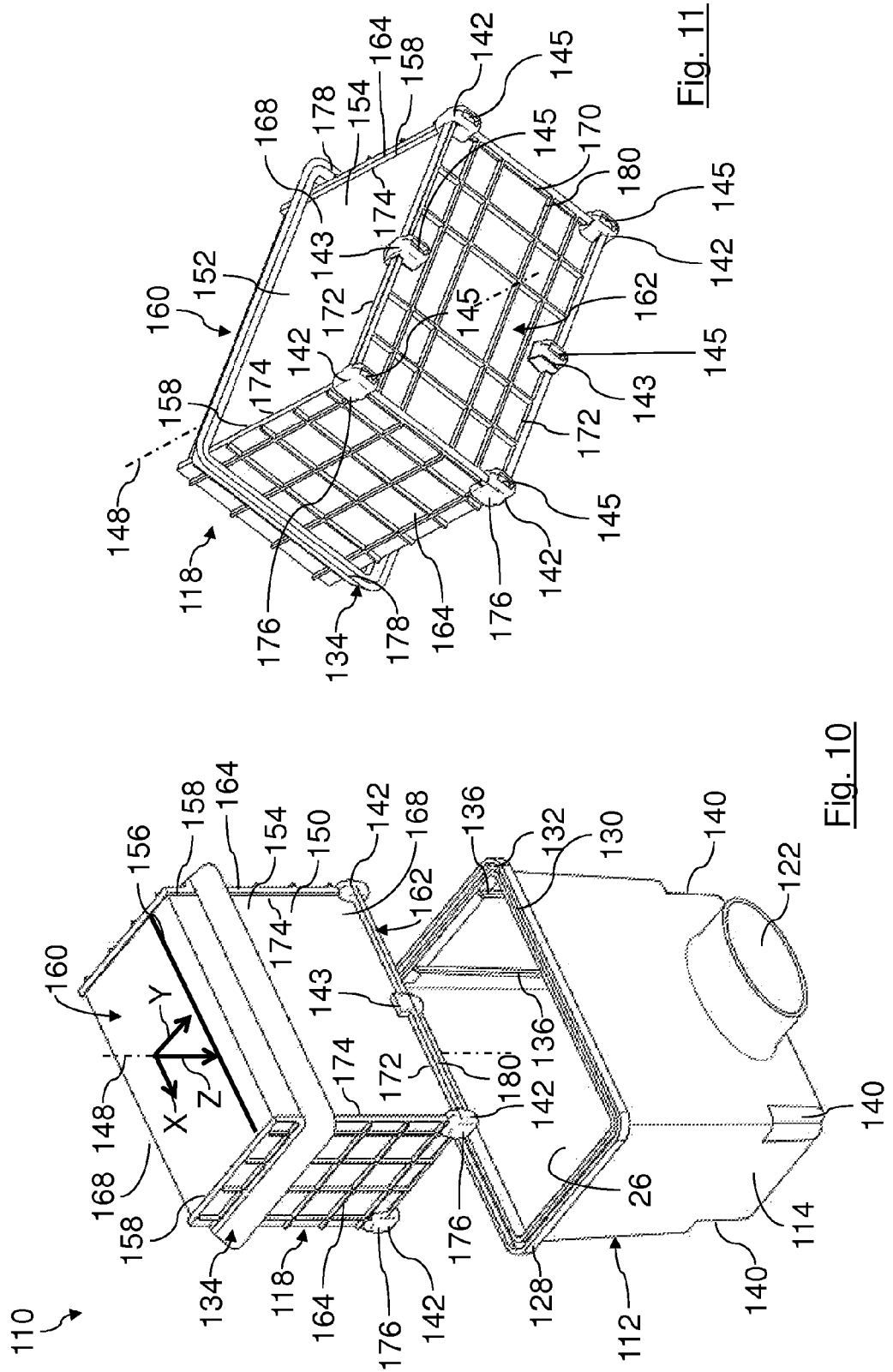

FILTER ELEMENT AND AIR FILTER

CROSS-REFERENCE TO RELATED APPLICATIONS

This application is a continuation application of international application No. PCT/EP2013/056223 having an international filing date of 25 Mar. 2013 and designating the United States, the international application claiming a priority date of 23 Mar. 2012, based on prior filed German patent application No. 10 2012 005 732.6; a priority date of 23 Mar. 2012, based on prior filed German patent application No. 10 2012 005 731.8; and a priority date of 23 Mar. 2012, based on prior filed German patent application No. 10 2012 005 734.2, the entire contents of the aforesaid international application and the aforesaid German patent applications being incorporated herein by reference.

BACKGROUND OF THE INVENTION

The invention concerns a filter element, in particular flat filter element, in particular of an air filter, in particular of an internal combustion engine, in particular of a motor vehicle, comprising a filter bellows on which at least one support element is arranged for supporting the filter element relative to a filter housing in which the filter element can be arranged.

Moreover, the invention concerns an air filter, in particular of an internal combustion engine, in particular of a motor vehicle, comprising a filter housing that comprises a housing interior, at least one inlet for air to be purified and at least one outlet for purified air, and a filter element, in particular a filter element according to the invention, arranged in the housing interior such that it separates the at least one inlet from the at least one outlet, wherein the filter element comprises a filter bellows on which at least one support element is arranged for supporting the filter element relative to the filter housing.

GB 1 446 195 discloses an air filter unit comprising a filter element and a lateral frame. The filter element can be comprised of filter paper or any other suitable material. The lateral frame comprises a sealing ring. The sealing ring is of the same material as the rest of the frame. It is an integral component of the frame. On each of the four sidewalls of the frame, a plurality of cylindrical projections are formed. During operation, the air filter unit is arranged in a filter housing. The filter housing comprises two housing halves with rectangular cross-section. The filter unit is inserted into a receptacle in the filter housing such that the projections contact an end face of a first one of the housing halves. The two housing halves are held together and held relative the filter unit by means of quick attachment means. The seal is pressed against the first housing half. The projections along the four sidewalls of the frame ensure a correct arrangement of the filter unit in the filter housing.

The invention has the object to design a filter element and an air filter of the aforementioned kind in such a way that the filter element can be secured more reliably and/or positioned more precisely in the filter housing. In particular, the filter element, in particular the filter bellows, is to be protected from mechanical loads.

SUMMARY OF THE INVENTION

This object is solved according to the invention in that the at least one support element is arranged directly and/or indirectly on at least one edge of the filter bellows and projects outwardly past the filter bellows.

According to the invention, the at least one support element projects past at least one edge of the filter bellows. In this way, the at least one edge is protected.

The at least one support element can advantageously be arranged on an exterior side, in particular an end face, of the filter bellows. The at least one edge of the filter bellows, that has the at least one support element arranged in its area, is advantageously formed by at least two exterior sides of the filter bellows that adjoin each other. Advantageously, the at least one support element projects outwardly on the filter bellows past at least one of the sides that form the at least one edge.

The at least one edge can advantageously be a real edge, in particular a fold edge of a filter medium of which the filter bellows is folded. However, it can also be an edge which is formed of surfaces of which at least one envelopes a side of the filter bellows or which is defined by other real points, lines or edges of the filter bellows, in particular end face edges or fold edges of a folded filter bellows.

Advantageously, the at least one support element can engage about or frame the at least one edge. The at least one support element can extend across both sides, in particular surfaces, that form the at least one edge.

The at least one support element can project past one of the sides to the exterior. In this way, a support action in one direction can be realized. The at least one support element may also project past both adjoining sides. In this way, a support action in both directions is made possible. Advantageously, the at least one support element can project past the filter bellows in a radial and/or an axial direction relative to an element axis or an axis that is parallel to the element axis. In this way, the filter element can be supported accordingly in radial and/or axial direction relative to the element axis or the parallel axis on the filter housing.

The at least one support element can contact the filter bellows, in particular the at least one edge. The at least one support element can also be arranged at the at least one edge at a spacing relative to the filter bellows. The at least one support element can also be indirectly connected by means of a connecting means, in particular an end member and/or a connecting member, with the filter bellows. In this case, the at least one support element can be arranged such that it contacts the filter bellows or such that it is arranged at a spacing to the filter bellows at the at least one edge.

The at least one support element can be arranged at different locations of the filter bellows. It is also possible to arrange at different planes of the filter bellows different support elements. In this way, a uniform support of the filter element in the filter housing can be realized even for a complex configuration of the filter housing and/or of the filter bellows.

The at least one support element can advantageously be designed such that it can compensate a positional tolerance of the filter element in the filter housing. Moreover, the at least one support element can be provided with vibration-damping properties. In this way, in particular operation-caused vibrations of the filter housing on the filter element, in particular the filter bellows, can be dampened. In this way, mechanical loading of the filter bellows can be reduced. The service life of the filter bellows can thus be prolonged.

The at least one support element can protect the at least one edge of the installed filter bellows in the filter housing. In this way, it can be prevented that the filter bellows, in particular the filter medium of which the filter bellows is comprised, can rub on the filter housing. Rubbing could cause damage to the filter bellows, in particular the filter medium.

Moreover, with the at least one support element the at least one edge of the filter bellows can be protected during installation in the filter housing. The filter element can advantageously be inserted through a closable installation opening of a housing part. Upon insertion, the at least one support element can prevent that the at least one edge can rub on the filter housing part and can thereby be damaged.

Upon installation of the filter element in the filter housing, the at least one support element can advantageously serve as a guide. Such a guide simplifies the installation of the filter element. This is in particular advantageous when using a filter housing whose inner cross-section tapers away from the installation opening in axial direction relative to a housing axis.

Advantageously, the at least one support element can be arranged on the front side of the filter bellows which is leading in the installation direction of the filter element or can at least project past this side. In this way, the protective function and/or the guiding function of the at least one support element can be further improved.

Moreover, the at least one support element can protect the at least one edge during packaging, during storage and/or during transport of the filter element. The at least one support element can protect the filter element when it is dropped in particular onto hard ground.

Advantageously, on several edges support elements and/or on at least one edge several support elements can be arranged. In this way, the support action and/or the protective function and/or the tolerance compensation can be further improved. Moreover, in this way possibly occurring mechanical loads can be distributed more uniformly onto the filter element.

Advantageously, the at least one support element can be separate from possible seals of the filter element. In particular, the at least one support element itself can have no sealing function. In this way, the at least one support element can be positioned independent of a corresponding sealing surface on the filter bellows. The at least one support element can thus be optimized with regard to its support function. It can be arranged on locations of the filter housing which are suitable relative to the support action and/or installation space. Moreover, a shape of the at least one support element and an appropriate size can be selected more freely.

In particular in case of heavy filter elements and/or filter elements that are expansive in the direction of an element axis and that are suspended or fastened in the area of an axial end in the filter housing, as is the case in particular for flat filter elements with deep folds, there may be the risk that the filter elements in the filter housing may swing about their suspension or attachment. This swinging action may cause damage of the filter bellows. Moreover, the swinging action may mechanically load or possible damage the suspension or attachment. Such large and/or heavy filter elements are used in particular in commercial vehicles, in particular trucks or buses. With the at least one support element the swinging action of the filter element in the filter housing can be reduced, preferably prevented. The at least one support element can mechanically relieve the suspension or attachment of the filter element in the filter housing.

Advantageously, the at least one support element can support the filter element on a side that is opposite relative to a suspension or attachment in the filter housing. In this way, a tilting effect of the filter element in the filter housing can be reduced. In this way, mechanical loading of the filter element, in particular filter bellows, can be reduced. Without the use of the at least one support element, tilting effects may occur which may damage the filter bellows in particular in case of large filter elements.

Advantageously, several support elements can be arranged on exterior sides of the filter bellows that are opposite each other relative to the element axis. In this way, the filter element can be supported on opposite sides and can be clamped and secured between corresponding opposite walls of the filter housing.

Advantageously, the at least one support element can be arranged in a modular fashion on the filter bellows. In particular, several support elements which may differ in size and/or shape can be mounted selectively on the filter bellows. In this way, one and the same filter element can be selectively arranged in different filter housings. With appropriate selection of the at least one support element, possible installation space differences can be compensated.

Advantageously, the at least one support element can be arranged detachably on the filter bellows. In this way, when using the filter element in a different filter housing, the at least one support element can be exchanged accordingly for another, in particular larger, smaller and/or differently shaped, support element.

Advantageously, the at least one support element can be configured additionally as an actuating element for actuating a functional component of the filter element, in particular a switch or an opening. In particular, the at least one support element can interact with an opening in a housing bottom, a servicing switch, a membrane for a water drainage and/or a hot air intake. In this way, an additional actuating component is not needed. The actuation can be realized automatically upon installation of the correct filter element.

The at least one support element can additionally or alternatively also act as a coding element. It can be designed such that a correct installation of the filter element in the filter housing is possible only when the filter element is provided with at least one support element that matches the filter housing.

The at least one support element can advantageously be a flexible component, in particular of rubber or elastomer. In this way, tolerance compensation and/or vibration damping can be improved. The at least one support element can be produced separately and can be connected afterwards with the filter bellows. Alternatively, the at least one support element can be directly or indirectly connected, in particular by a two-component injection molding process, with the filter bellows.

Advantageously, the filter element can be a flat filter element. The flat filter element may comprise a zigzag-folded filter medium formed as the filter bellows. In case of flat filter elements the filter media are not closed, i.e., end face folds, like end face edges, are not connected to each other. In contrast thereto, in case of round filter elements, the filter media are closed, meaning that their end face folds are connected to each other. The end face folds are the two outer folds on opposite end faces of the filter bellows. End face edges are the two free edges of the filter medium which extend along the end face folds and delimit them at the end faces of the filter bellows. The end face edges of the filter bellows are the two other free edges of the filter bellows that extend between the end face edges and extend in accordance with the folds of the filter bellows. The fold edges are the edges along which the filter medium is folded. In case of a zigzag-folded parallelepipedal filter bellows, the end face edges and the fold edges are straight and extend parallel to each other. The end face edges extend in a zigzag shape and perpendicular to the end face edges and the fold edges. The end face edges each define an end face edge side of the filter bellows.

Preferably, the filter bellows has approximately the shape of a polyhedron. Advantageously, the filter bellows can be cubic, parallelepipedal, pyramid-shaped prism-shaped, wedge-shaped, or the like.

In order to facilitate understanding, in the present description of approximately parallelepipedal flat filter elements an axis that extends parallel to the fold edges is referred to as x-axis. An axis of the flat filter element that is extending perpendicular to the x-axis in parallel to the height of the folds is referred to as z-axis. An axis that extends perpendicular to the x-axis and perpendicular to the z-axis is referred to as y-axis.

Advantageously, the element axis of the filter element may coincide with the z-axis. Advantageously, installation of the filter element in the filter housing can be done in the direction of the z-axis. The installation direction can thus coincide with the z-axis. Advantageously, the filter axis may cross an inflow side and an outflow side of the filter element. The main flow direction of the fluid to be filtered through the filter bellows can advantageously extend parallel to the z-axis. Advantageously, a housing axis of the filter housing may extend parallel to the z-axis. In particular, the housing axis can extend axially to the element axis.

Advantageously, the filter bellows can have deep folds. This means that for a parallelepipedal filter bellows an extension in the direction of the z-axis, which corresponds to the fold height, is greater than the extension in the direction of the x-axis and/or in the direction of the y-axis. It is also possible to provide variable fold heights and/or fold extensions. The fold heights and/or fold extensions can be varied appropriately in the filter bellows.

Advantageously, the filter element can be arranged in an air filter of a commercial vehicle, in particular of a truck, of a bus, of a construction vehicle or of an agricultural vehicle. Such filter elements can be of a larger size in comparison to filter elements of passenger cars.

In an advantageous embodiment, the at least one support element can be arranged at a corner of the filter bellows. In this way, the at least one support element can protect several edges of the filter bellows which meet at the corner. By arrangement of the at least one support element at the corner, a support in radial as well as in axial direction relative to an element axis is possible.

Advantageously, on opposite corners of the filter bellows one support element each can be arranged. In this way, the filter bellows can be more uniformly supported. Also, the corners can be protected better against being damaged, in particular when the filter element is dropped and/or upon installation of the filter element in the filter housing.

Corners where the support elements are located can advantageously be positioned opposite each other relative to the element axis, in particular the z-axis. In this way, the filter element can be supported relative to the element axis at radially opposed sides on the filter housing.

Alternatively or additionally, the corners on which the support elements are located can be positioned opposite each other relative to a plane that is defined by the element axis, in particular the z-axis, and the x-axis and/or relative a plane that is defined by the element axis, in particular the z-axis, and the y-axis. In this way, the filter element can be supported accordingly in the direction of the x-axis and/or in the direction of the y-axis on the filter housing.

Advantageously, a support element can be provided, respectively, on all front corners of the filter bellows in the installation direction of the filter element in the filter housing. In this way, the filter element can be uniformly protected and supported at its front side in the installation direction. Moreover, the support elements can also contribute as guide elements to improvement and/or simplification of the installation of the filter element in the filter housing.

In a further advantageous embodiment, the at least one support element can project past all sides of the filter bellows that adjoin the at least one edge, optionally the corner. In this way, the filter bellows with the at least one support element can be protected and supported in all free directions.

In a further advantageous embodiment, at least one connecting member, in particular an end member, can be connected at least along the at least one edge with the filter bellows and the at least one support element can be attached on the at least one connecting member directly or indirectly.

The at least one connecting member can be advantageously arranged on a lateral surface relative to the element axis or on a front surface.

The at least one connecting member can advantageously contribute to stabilization and/or shaping of the filter bellows. By arranging the at least one support element on the at least one connecting member, the filter element, in particular the filter bellows, can be mechanically further relieved in particular relative to the support action on the filter housing. A support force can be transmitted from the filter housing through the at least one support element and the at least one connecting member more uniformly and/or across a larger surface area onto the filter element, in particular the filter bellows.

The at least one connecting member can advantageously be connected by means of an adhesive, by welding or according to an injection molding process with the filter element, in particular the filter bellows. The at least one connecting member can be connected at or on the filter bellows by foaming. It can also be connected in another mechanical way, in particular by means of a latching device or a clamping device, with the filter element, in particular the filter bellows.

The at least one connecting member can extend with at least one side along the edge on which the at least one support element is located. Advantageously, the at least one connecting member can extend across at least one of the sides of the filter bellows which forms the at least one edge with the at least one support element. In this way, the filter element, in particular the filter bellows, is uniformly supported at the corresponding side.

The at least one connecting member can be a frame or part of a frame which surrounds the filter bellows at least partially about the circumference.

Advantageously, the at least one connecting member can comprise at least one fastening means with which the at least one support element can be connected. Advantageously, with the at least one fastening means a plug-in connection, in particular a latching connection, can be realized. With a plug-in connection, a force transmission axial to an insertion direction of the connection can be realized in a simple way. Advantageously, the plug-in direction of the connection can be axial to a support direction of the at least one support element relative to the filter housing. In this way, the support action can be further improved. Advantageously, the insertion direction can be parallel to the element axis and/or the installation direction of the filter element in the filter housing. Advantageously, the at least one fastening means can comprise particularly an arrow-shaped or pin-shaped projection onto which the at least one support element is pushed. The at least one support element can be form-fittingly connected with the at least one fastening means.

The at least one fastening means can advantageously be arranged on a corner of the at least one connecting member. In this way, the at least one support element can be mounted simply in an appropriate corner of the filter bellows.

The at least one support element can be detachably or non-detachably connected with the at least one connecting member.

The at least one connecting member can be an injection-molded plastic frame. The at least one fastening means can be an extension of the frame. It can be monolithically formed with the frame.

The connecting member can be advantageously an end member. The end member can advantageously seal the filter bellows on the corresponding side where it is attached. The end member can advantageously be arranged on an end face edge side of a folded filter bellows. The at least one end member can be realized as an end disk. By means of the disk shape, the space requirement can be reduced. Preferably, the disk-shaped end member can be produced of a hard plastic component but also, alternatively or additionally, can have a nonwoven strip that covers the correlated side of the filter bellows.

Advantageously, the at least one support element can also be attached indirectly on the at least one connecting member.

In a further advantageous embodiment, the at least one support element can be attached on a carrier member, in particular a carrier grid, which can be connected or connectable to the at least one connecting member. On the carrier member the at least one support element can be pre-mounted. The at least one support element together with the carrier member can be connected with the at least one connecting member. In this way, the assembly expenditure can be reduced. With the carrier member, the filter element, in particular the filter bellows, can be additionally stabilized. The carrier member can be connected fixedly with the at least one connecting member. It can also be connected detachably with the at least one connecting member.

Advantageously, the carrier member can be arranged on the front side of the filter bellows in the installation direction. In this way, the carrier member can protect the filter bellows upon installation into the filter housing.

The carrier member can be advantageously a carrier grid. The carrier grid can be advantageously permeable for fluid. Accordingly, the carrier grid can also be arranged on an outflow side or an inflow side of the filter bellows. In this way, an inflow side or an outflow side can also be stabilized and/or protected by the carrier grid.

The carrier member can be advantageously designed such that it can be attached with respective sections to several connecting members which can extend on different sides of the filter bellows.

Advantageously, the carrier member can be arranged between two end members of the filter bellows. It can be connected with one side, respectively, to the appropriate end member.

Advantageously, the at least one carrier member can comprise appropriate attachment means, in particular projections or insertion pins, for attaching, in particular plugging in, the at least one support element.

In a further advantageous embodiment, the carrier member can be connected by means of a plug-in connection, in particular a latching connection, with the at least one connecting member. The latching connection can be simply connected and released. In this way, the carrier member can be connected simply with the at least one connecting member. A latching connection is moreover mechanically stable.

Advantageously, the connection is detachable. Upon exchange of the filter element it is thus possible to separate the at least one carrier member with the at least one support element attached thereto from the filter bellows. The carrier member with the at least one support element can be reused.

The carrier member can be designed as a modular component. Accordingly, depending on the use of the filter element, different carrier members can be used in different filter housings.

Advantageously, the at least one support element can be connected with a plug-in connection, in particular a latching connection, with the carrier member. With a plug-in connection, a force transmission axial to the insertion direction of the connection can be realized in a simple way. Advantageously, the insertion direction of the connection can be axial to a support direction of the at least one support element relative to the filter housing. In this way, the support action can be further improved. Advantageously, the insertion direction can be parallel to the element axis and/or installation direction of the filter element into the filter housing. In this way, the support function can be further improved.

In a further advantageous embodiment, a seal, circumferentially extending relative to an element axis, can be provided for sealing relative to the filter housing. With the seal, a raw fluid side and a clean fluid side of the filter element can be separated reliably from each other. Accordingly, the at least one inlet and the at least one outlet of the filter housing can be reliably separated from each other.

The seal can have additionally a holding function. Advantageously, the seal can be resting on or at a sealing surface of the filter housing. The filter element can advantageously be suspended or attached by means of the seal in the filter housing. The sealing surface can advantageously be arranged in the vicinity of the installation opening.

In a further advantageous embodiment, the at least one support element can be arranged on a side of the filter bellows that, relative to the element axis, is axially opposite to the seal. Accordingly, the filter element can be reliably supported on opposite sides with the seal, on the one hand, and with the at least one support element, on the other hand. In this way, swinging of the filter element in the filter housing can be prevented. The mechanical load of the filter element, in particular of the filter bellows, can thus be reduced. Optionally, the carrier member can be arranged on the side of the filter bellows that, relative to the element axis, is axially opposite to the seal.

Advantageously, an extension of the filter element in a plane radial to an installation direction can be smaller in the area of the at least one support element than in the area of the seal. In this way, the filter element, upon installation into the filter housing with the side with the at least one support element leading, can be guided past a corresponding sealing surface of the filter housing for the seal through the installation opening. The comparatively larger seal can rest on the sealing surface.

Moreover, a housing interior of the filter housing can taper in the installation direction. With an appropriately smaller outer cross-section of the filter element on the side with the at least one support element, the filter element can be easily installed in the filter housing.

Tests have shown that optimal results with respect to the support action and/or installation can be achieved when a ratio of the outer cross-section at the side with the at least one support element relative to the outer cross-section in the area of the seal is predetermined depending on an axial spacing, relative to the element axis, between the at least one support element and the at least one seal.

In a further advantageous embodiment, a support spacing in a first radial plane, transverse, in particular perpendicular, to the element axis, between radial outer support sections of two support elements which, relative to an axial plane in which the element axis is positioned, are oppositely positioned and which, when the filter element is installed, can be supported radial to the element axis or to an axis that is parallel to the element axis relative to the filter housing, can be smaller than a sealing spacing in a second radial plane, parallel to the first radial plane, between two sealing sections of the seal that are positioned opposite each other relative to the axial plane which sealing sections, when the filter element is installed, can seal relative to corresponding sealing surfaces of the filter housing. In this way, the support function and the force transmission onto the filter bellows can be further improved.

Advantageously, the support spacing can be smaller by a value that can be predetermined depending on the axial spacing relative to the element axis between the support section and the sealing section on the same circumferential side of the filter bellows.

Advantageously, the support spacing can correspond approximately to the sealing spacing, minus between approximately 2% and 5%, preferably 3.5%, of the preferably average axial spacing between the support sections and the sealing sections. In this way, optimal results with regard to the support action and force transmission can be achieved.

The technical object is further solved according to the invention by the air filter in that the at least one support element is arranged directly or indirectly on at least one edge of the filter bellows and is outwardly projecting past the filter bellows.

The advantages and features indicated above in connection with the filter element according to the invention and its advantageous embodiments apply likewise to the air filter according to the invention, and vice versa.

Advantageously, the filter housing can comprise a closable installation opening through which the filter element is insertable into the housing interior.

Advantageously, an inner cross-section of the filter housing on the side axially opposite the installation opening relative to the housing axis can be tapered at least sectionwise relative to an opening cross-section of the installation opening.

Advantageously, at least two circumferential sides of the filter housing that, relative to the housing axis, are positioned radially opposite each other can converge toward each other.

Advantageously, the filter housing on the side which is axially opposite the installation opening relative to the housing axis can comprise at least one support bearing on which the filter element with the at least one support element can be supported. Advantageously, at least one support bearing can be arranged on at least one radial inner circumferential side of the filter housing.

The at least one support bearing can advantageously be suitable for a support action axial to the housing axis, in particular axial to the element axis. Alternatively or additionally, the at least one support bearing can be configured for a support action radial to the housing axis, in particular to the element axis, or to an axis that is parallel to the housing axis. The at least one support bearing can advantageously be arranged on a sidewall of the filter housing.

With the at least one support bearing a force transmission between the filter housing and the filter element in axial and/or radial direction can be improved. Moreover, with the at least one support bearing an installation depth of the filter element into the filter housing in the installation direction can be limited.

Advantageously, the at least one support bearing can be designed as a coding element which is matched to the at least one support element. In this way, it can be prevented that a filter element which does not match the filter housing is installed in the filter housing. In this way, operating safety of the air filter can be improved. Advantageously, the at least one support bearing can comprise at least one positioning knob which can engage an appropriate positioning receptacle of the at least one support element, when the filter element is correctly installed. The at least one support bearing can moreover have a bearing surface on which the at least one support element can rest.

BRIEF DESCRIPTION OF THE DRAWINGS

Further advantages, features, and details of the invention result from the following description in which embodiments of the invention will be explained in more detail with the aid of the drawing. A person skilled in the art will expediently consider the features disclosed in combination in the drawing, the description, and the claims also individually and combine them to other meaningful combinations.

FIG. 1 shows an exploded illustration of an air filter with a flat filter element of a motor vehicle according to a first embodiment.

FIG. 2 shows an exploded illustration of the air filter of FIG. 1 in another perspective view.

FIG. 3 shows a closed air filter of FIGS. 1 and 2.

FIG. 4 is a plan view of the air filter of FIG. 3.

FIG. 5 shows a transverse longitudinal section of the air filter of FIG. 4 along the section line V-V indicated therein.

FIG. 6 shows a lengthwise longitudinal section of the air filter of FIG. 4 along the section line VI-VI indicated therein.

FIG. 7 shows a lengthwise longitudinal section of the flat filter element of the air filter of FIG. 4 along the section line VII-VII indicated therein.

FIG. 8 is a detail view of the air filter of FIG. 6 along the section line VIII-VIII indicated therein.

FIG. 9 is a detail view of the air filter of FIG. 5 along the section line IX-IX indicated therein.

FIG. 10 is an exploded illustration of a housing cup with a flat filter element of an air filter according to a second embodiment, which is similar to the air filter of FIGS. 1 to 9.

FIG. 11 shows a detail view of the flat filter element of FIG. 10.

The illustrations of FIGS. 1 to 13 are not true to scale. In the Figures same components are provided with same reference characters.

DESCRIPTION OF PREFERRED EMBODIMENTS

Figure 12:
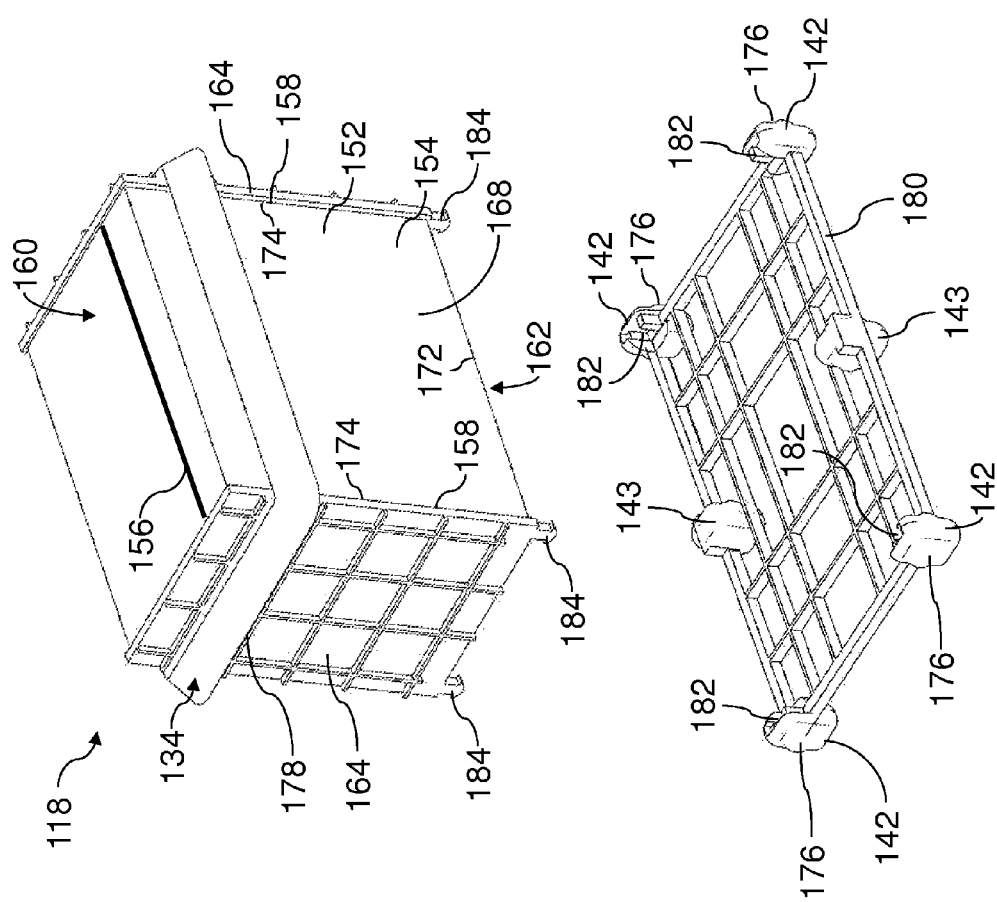
FIG. 12 is an exploded illustration of the flat filter element of FIGS. 10 and 11.

In FIGS. 1 to 9, an air filter 10 of an internal combustion engine of a motor vehicle according to a first embodiment is illustrated in various perspective views and section views. The air filter 10 comprises a filter housing 12 that can be opened and is combined of a housing cup 14 and a housing cover 16. In the filter housing 12, a filter element 18 is exchangeably arranged.

The filter housing 12 has an inlet 20 for air to be filtered which is located centrally in the housing cover 16. An outlet 22 for filtered air is located in a sidewall of the housing cup 14.

The filter housing 12 as a whole is approximately parallelepipedal. It is flat in the direction of an x-axis of the filter element 18. In the direction of the housing axis 24, which is extending through the housing cup 14 and the housing cover 16, the filter housing 12 is elongate. The housing axis 24 extends in the illustrated embodiment coaxial to a z-axis of the filter element 18. The z-axis of the filter element 18 is perpendicular to the x-axis. In the illustrated embodiment, an installation direction of the filter element 18 into the housing cup 14 extends axial to the housing axis 24. The inlet 20 is coaxial to the housing axis 24.

The housing cup 14 has on its side which is facing the housing cover 16 an installation opening 26 which can be closed off with the housing cover 16. The installation opening 26 has a rectangular cross-section. Through the installation opening 26 the filter element 18 can be inserted into the housing cup 14.

The installation opening 26 is surrounded by a cup-associated mounting flange 28 that extends radially outwardly at the exterior side of the housing cup 14 relative to the housing axis 24. The cup-associated mounting flange 28 has a sealing groove 30 which surrounds the installation opening 26 circumferentially closed and which is open on the side which is facing away from the walls of the housing cup 14. A bottom of the sealing groove 30 forms a sealing surface 32 on which, with the air filter 10 closed, a seal 34 of the filter element 18 is resting seal-tightly.

On the radial inner circumferential sides of the narrow side walls of the housing cup 14, two parallel guide webs 36 are monolithically arranged. The guide webs 36 extend axially to the housing axis 24. During installation, they serve as a guide for the filter element 18 into the housing cup 14.

At the ends of the guide webs 36 facing away from the installation opening 26 there is a bearing surface 38 of appropriate support bearings 40, respectively. When the filter element 18 is installed, a support element 42 of the filter element 18 can be axially supported relative to the housing axis 24 at the bearing surfaces 38, respectively.

On the bearing surfaces 38 a positioning knob 43 is centrally arranged, respectively, which are parallel to the housing axis 24. When the filter element 18 is installed, the positioning knobs 43 engage appropriate positioning receptacles 45 at the end faces of the support elements 42.

The support bearings 40 are realized as recesses in the longitudinal edges of the housing cup 14 and are axial relative to the housing axis 24. The support bearings 40 each extend radially and axially relative to the housing axis 24. Viewed axially from a cup bottom 44 of the housing cup 14 relative to the housing axis 24, the support bearings 40 end in front of a circumferential side of the outlet 22 facing away from the cup bottom 44.

The housing cup 14 tapers in the direction of the x-axis as well as in the direction of a y-axis of the filter element 18 away from the mounting opening 26 toward the cup bottom 44. The y-axis is perpendicular to the x-axis and perpendicular to the z-axis.

The housing cover 16 has a cover-associated mounting flange 46 which surrounds the housing axis 24 circumferentially. When the filter housing 12 is mounted, as shown in FIGS. 5 and 6, a radial outer rim of the cover-associated mounting flange 46 relative to the housing axis 24 engages the sealing groove 30. In this way, the seal 34 is tightly clamped between the cover-associated mounting flange 46 and the cup-associated mounting flange 28. The seal 34 has an extension that, relative to the element axis 48 of the filter element 18, is slanted and approximately umbrella-shaped. The element axis 48 extends in the direction of the z-axis of the filter element 18. When the filter element 18 is installed, the element axis 48 coincides with the housing axis 34 in the illustrated embodiment.

On the inner sides of the narrow transverse walls of the housing cover 16, two reinforcement ribs 50 are arranged monolithically that are shown in FIGS. 2 and 5.

The filter element 18 is configured as a flat filter element. The filter element 18 comprises an approximately parallelepipedal filter bellows 52 of a zigzag-folded filter medium 54. The filter medium 54 can be filter paper, filter nonwoven, or another foldable filter medium that is suitable for filtering air. The filter bellows 52 can also be comprised of a filter medium that is not folded, for example, a filter foam or a wound filter medium. The filter medium 54 is folded along fold edges 56. The fold edges 56 extend parallel to each other and parallel to the x-axis of the filter element 18.

One of the fold edges 56 at the inflow side is shown in an exemplary fashion in FIG. 1. In FIG. 2, one of the fold edges 56 at the outflow side is shown. The fold heights of the folded filter medium 54 extend axial to the element axis 48. An axial height of the filter bellows 52 relative to the element axis 48 is significantly greater than the width of the filter bellows 52 in the direction of the x-axis and the length of the filter bellows 52 in the direction of the y-axis of the filter element 18. The folds can therefore be referred to as deep.

End face edge sides 58 are defined by end face edges of the filter bellows 52. They are located on sides that are opposite each other relative to the element axis 48. The end face edge sides 58 extend parallel to each other and parallel to a plane which is defined by the y-axis and the z-axis.

An inflow side 60, in FIGS. 1 and 2 at the top, is defined by the fold edges 56 on the side which is facing the housing cover 16.

An outflow side 62, in FIGS. 1 and 2 at the bottom, is defined by the fold edges 56 at the side which is facing the cup bottom 44 of the housing cup 14.

On the end face edge sides 58 of the filter bellows 52, an end disk 64 is respectively seal-tightly connected with the end face edges of the filter medium 54 located thereat. The end disks 64 are comprised each of a grid which is embedded in plastic material. The end disks 64 are rectangular.

The seal 34 surrounds the filter bellows 52 and the end discs 64 relative to the element axis 48, in circumferentially closed form. It is located somewhat below the inflow side 60.

The end disks 64 each have two plug-in projections 66. The plug-in projections 66 are located at the edges which are facing the outflow side 62 adjacent to the local corners of the end disk 64. Some of the plug-in projections 66 are shown in section in FIGS. 6 to 8. The plug-in projections 66 each extend axially relative to the element axis 48 away from the outflow side 62 of the filter bellows 52. The plug-in projections 66 are monolithically joined with the end discs 64.

One of the support elements 42 is pushed onto the plug-in projections 66, respectively. The support elements 42 are made of an elastic material, for example, rubber or elastomer. The support elements 42 are positioned on the outflow side 62 that is axially opposite the seal 34 relative to the element axis 48. They are arranged on the four corners of the outflow side 62 of the filter bellows 52. The support elements 42 are located thus on a first edge 70, respectively, which is formed by one of the end face edge sides 58 and the outflow side 62. Moreover, each support element 42 is located on a second edge 72 which is formed by a corresponding front side 68 of the filter bellows 52 and the outflow side 62. The front sides 68 extend, respectively, between the two end face edge sides 58, on the one hand, and the inflow side 60 and the outflow side 62, on the other hand. The front sides 68 each are formed by end face folds of the filter bellows 52. Also, each support element 42 is located on a third edge 74 of the filter bellows 52 which is formed by the corresponding front side 68 and the corresponding end face edge side 58. The three edges 70, 72, and 74 meet at the corners.

The support elements 42 project past the respective end face edge side 58 of the filter bellows 52 axially relative to the element axis 48. Moreover, the support elements 42 project past the respective end face edge side 58 axially relative to the y-axis. Also, the support elements 42 project past the respective front side 68 axially relative to the x-axis. As a whole, the support elements 42 project past the filter bellows 52 axially and radially relative to the element axis 48.

For a correctly installed filter element 18, each of the support elements 42 is supported axially relative to the housing axis 24 and to the element axis 48 on the corresponding bearing surface 38 of the support bearing 40. Moreover, each support element 42 is supported on the corresponding longitudinal sidewall of the housing cup 14 axially relative to the y-axis of the filter element 18. Moreover, each support element 42 is supported on the corresponding transverse sidewall of the housing cup 14 axially relative to the x-axis.

The support spacing 75, axial relative to the x-axis and illustrated in FIG. 6, of the end face edge-associated outer support sections 76 of the two support elements 42, positioned opposite each other relative to a plane defined by the y-axis and the z-axis, is respectively smaller than a sealing spacing 77, axial to the x-axis, of end face edge-associated sealing sections 78 of the seal 34. The support spacing 75 corresponds approximately to the sealing spacing 77, minus between approximately 2% and 5%, preferably 3.5%, of an axial spacing 79, relative to the element axis 48, between the end face edge-associated outer support section 76 and the corresponding end face edge-associated side sealing sections 78.

For installation, the filter element 18 with the inflow side 62 leading is inserted axial to the element axis 48 and to the housing axis 24 through the installation opening 26 into the housing cup 14. In this context, the filter element 18 is guided with the end disks 64 along the guide webs 36.

When the filter element 18 is correctly mounted, the front sides of the support elements 42 relative to the element axis 48 are contacting the bearing surfaces 38 of the support bearings 40. The positioning knobs 43 extend into the appropriate positioning receptacles 45. The end face edge-associated outer support sections 76 and the corresponding front-side support sections of the support elements 42 are resting on the corresponding sidewalls of the filter cup 14.

The seal 34 projects into the sealing groove 30 of the housing cup 14. The filter element 18 is suspended by the seal 34 in the housing cup 14. The end face edge-associated sealing sections 78 and the front-side sealing sections of the seal 34 are resting in this context on the sealing surface 32 of the sealing groove 30.

In FIGS. 10 through 12, a second embodiment of an air filter 110 is illustrated. Those elements that are similar to those of the first embodiments of FIGS. 1 to 9 are provided with the same reference characters with 100 being added.

In contrast to the first embodiment, in the second embodiment the support elements 142 are not directly attached to the end disks 164. They are attached on a carrier grid 180 which is connected with the end disks 164. In FIG. 12, the carrier grid 180 is shown in detail. The carrier grid 108 is permeable for air. It is located at the outflow side 162 of the filter bellows 142. It covers the outflow side 162 completely.

On its side facing the filter bellows 152, the carrier grid 180 has at its corners a latching receptacle 182, respectively. Correspondingly, the end disks 164 have at their corners facing the carrier grid 180 a latching pin 184, respectively. The latching pins 184 each have an arrow-shaped free end formed as a locking hook. For connecting the carrier grid 180 with the end disks 164, the latching pins 184 are inserted into the latching receptacles 182.

The support elements 142 are arranged fixedly on the corners of the carrier grid 180. Their extensions and their support functions correspond to the support elements 42 of the first embodiment.

Moreover, on the front-side edges of the carrier grid 180, two front-side intermediate support elements 143 are arranged. The intermediate support elements 143 are located, when the carrier grid 180 is mounted, on the edges 172 between the front sides 168 and the outflow side 162 of the filter bellows 152, respectively. The intermediate support elements 143 project each past the corresponding front side 168 of the filter bellows 152 in axial direction relative to the element axis 48, i.e., In the direction of the z-axis. The carrier grid 180 with the intermediate support elements 143 projects past the outflow side 162 at both front sides 168 in the direction of the y-axis, respectively.

The support elements 142 and the intermediate support elements 143 are integrally formed or injection-molded of elastic material onto the carrier grid 180. Alternatively, they can also be formed thereof monolithically. Also, appropriate push-on projections on the carrier grid 180 can be provided onto which the support elements 142 and/or the intermediate support elements 143 can be pushed, similar to the first embodiment.

Figure 13:
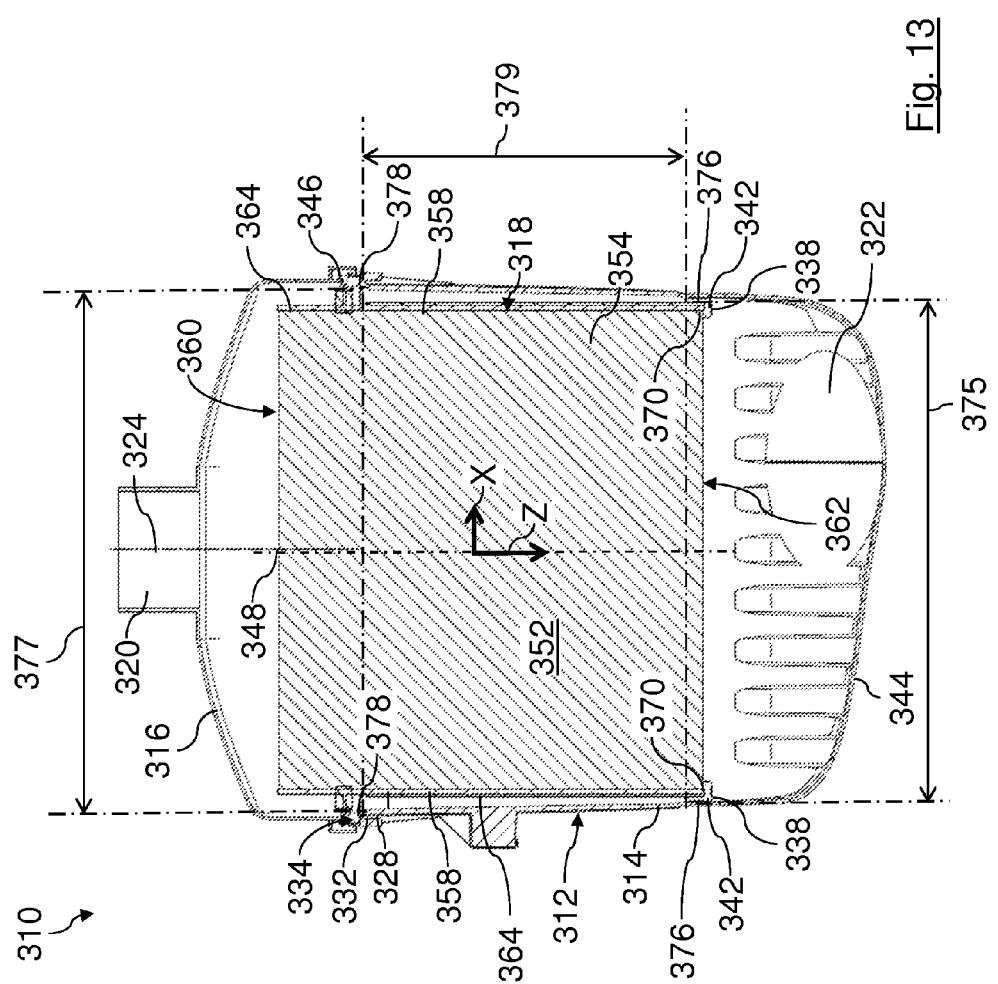
FIG. 13 shows a lengthwise longitudinal section of an air filter with a flat filter element according to a third embodiment which is similar to the air filter of FIGS. 1 to 9 and the air filter of FIGS. 10 through 12.

FIG. 13 shows a lengthwise longitudinal section of an air filter 310 according to a third embodiment. Those elements that are similar to those of the first embodiment of FIGS. 1 to 9 are provided with the same reference characters, with 300 being added. Accordingly, FIG. 13 shows:

310 air filter
312 filter housing
314 housing cup
316 housing cover
318 filter element
320 inlet
322 outlet
324 housing axis
328 cup-associated mounting flange
332 sealing surface
334 seal
338 bearing surface
342 support element
344 cup bottom
346 cover-associated mounting flange
348 element axis
352 filter bellows
354 filter medium
358 end face edge side
360 inflow side
362 outflow side
364 end disk
370 first edge
375 support spacing
376 support section
377 sealing spacing
378 sealing section
379 axial spacing While specific embodiments of the invention have been shown and described in detail to illustrate the inventive principles, it will be understood that the invention may be embodied otherwise without departing from such principles.

What is claimed is:

1. A filter element comprising:
a filter bellows having
   an inflow face receiving fluid to be filtered, the inflow face arranged a first axial side of the filter bellows;
   an axially opposing outflow face arranged an at axially opposite side of the filter bellows;
   wherein the inflow face and the outflow face are arranged such that a filter element axis extends through the inflow face and the outflow face on opposing sides of the filter bellows, the filter element axis defining a Z axis of a filter element coordinate system;
   the filter bellows having a front side and a laterally opposing rear side arranged on opposing sides of the filter bellows relative to a Y axis of the filter element coordinate system, the front side and the laterally opposing rear side extending from the inflow face to the outflow face;
   the filter bellows having a first end face and a laterally opposing second end face arranged on opposing sides of the filter bellows relative to an X axis of the filter element coordinate system, the first end face and the laterally opposing second end face extending from the inflow face to the outflow face and extending from the front side to the laterally opposing rear side;
wherein a first flow face is either the inflow face or the outflow face, the first flow face having
   a first flow face edge defined where the first flow face meets the front side of the filter bellows;
   a second flow face edge defined where the first flow face meets the laterally opposing rear side;
   a third flow face edge defined where the first flow face meets the first end face;
   a fourth flow face edge defined where the first flow face meets the second end face;
   a plurality of support elements configured as feet arranged on the filter bellows and adapted to support the filter element relative to a filter housing in which the filter element is to be arranged, the plurality of support elements having:
   a first end arranged at the first flow face and on at least one of the flow face edges of the filter bellows;
   an opposing second end, the second end forming a foot, the second end positioned outwardly away from the first end in a direction defined by the Z-axis, the foot configured to contact against the filter housing in which the filter element is to be arranged;
   wherein the plurality of support elements project in the Z axis direction, outwardly away from the first flow face and away from the filter bellows.

2. The filter element according to claim 1, wherein at least one of the plurality of support elements is detachably attached on the filter bellows.

3. The filter element according to claim 1, wherein at least one of the plurality of support elements is non-detachably attached on the filter bellows.

4. The filter element according to claim 1, wherein at least one of the plurality of support elements is directly attached to the filter bellows.

5. The filter element according to claim 1, wherein at least one of the plurality of support elements is arranged on a corner of the filter bellows;
wherein the corner is a corner of the first flow face where two adjacent ones of the flow face edges meet.

6. The filter element according to claim 5, wherein at least one of the plurality of support elements, in direction of the X and Y axes, projects laterally outwardly away from the first flow face and away from the filter bellows.

7. The filter element according to claim 1, further comprising
at least one end member arranged on, secured directly onto and covering the first end face side or the laterally opposing second end face of the filter bellows;
wherein the end member is arranged at the at least one of the flow face edges of the first flow face, the at least one end member secured onto the filter bellows at least along the at least one flow face edge,
wherein at least one of the plurality of support elements are attached to the at least one end member.

8. The filter element according to claim 7, wherein at least one of the plurality of support elements is directly connected to the end member.

9. The filter element according to claim 7, wherein at least one of the plurality of support elements is indirectly connected to the connecting member.

10. The filter element according to claim 7, further comprising
an airflow permeable carrier member arranged on and covering the inflow face or the outflow face of the filter bellows,
wherein at least one of the plurality of support elements is connected to the carrier member and the carrier member is connected to the at least one end member.

11. The filter element according to claim 10, wherein the carrier member is a carrier grid having airflow passages.

12. The filter element according to claim 10, wherein the carrier member is connected by a plug-in connection with the at least one connecting member.

13. The filter element according to claim 12, wherein the plug-in connection is a latching connection.

14. The filter element according to claim 1, further comprising
a circumferential seal that circumferentially surrounds an exterior of the filter element on the front side, the laterally opposing rear side, the first end face side and the laterally opposing second end face side;
wherein the seal is adapted to seal the filter element relative to the filter housing.

15. The filter element according to claim 14, wherein the at least one support element is arranged on the axial side of the filter bellows that is axially opposite the seal, relative to the filter element axis.

16. The filter element according to claim 14, wherein:
two of the plurality of support elements are oppositely positioned relative to each other relative to an axial plane, wherein the element axis of the filter element is located in the axial plane;
said two support elements are supported radially to the element axis or to an axis parallel to the element axis relative to the filter housing, when the filter element is installed in the filter housing;
the two support elements have radial outer support sections;
the seal has two sealing sections positioned opposite to each other relative to the axial plane;
the two sealing sections seal relative to appropriate sealing surfaces of the filter housing, when the filter element is installed in the filter housing;
wherein a support spacing between the outer radial support sections in a first radial plane transverse to the element axis is smaller than a sealing spacing between the two sealing sections in a second radial plane that is parallel to the first radial plane.

17. An air filter comprising:
a filter housing comprising a housing interior, at least one inlet for air to be purified, and at least one outlet for purified air;
a filter element arranged in the housing interior such that the filter element separates the at least one inlet from the at least one outlet;
the filter element comprising a filter bellows having
an inflow face for fluid to be filtered, the inflow face arranged a first axial side of the filter bellows;
an axially opposing outflow face arranged an at axially opposite side of the filter bellows;
wherein the inflow face and the outflow face are arranged such that a filter element axis extends through the inflow face and the outflow face on opposing sides of the filter bellows, the filter element axis defining a Z axis of a filter element coordinate system;
the filter bellows having a front side and a laterally opposing rear side arranged on opposing sides of the filter bellows relative to an Y axis of the filter element coordinate system, the front side and the laterally opposing rear side extending from the inflow face to the outflow face;
the filter bellows having a first end face side and a laterally opposing second end face side arranged on opposing sides of the filter bellows relative to an X axis of the filter element coordinate system, the first end face side and the laterally opposing second end face side extending from the inflow face to the outflow face and extending from the front side to the laterally opposing rear side;
wherein a first flow face is either the inflow face or the outflow face relative to flow of fluid to be filtered, the first flow face having
a first flow face edge defined where the first flow face meets the front side;
a second flow face edge defined where the first flow face meets the laterally opposing rear side;
a third flow face edge defined where the first flow face meets the first end face side;
a fourth flow face edge defined where the first flow face meets the second end face side;
a plurality of support elements configured as feet arranged on the filter bellows and adapted to support the filter element relative to a filter housing in which the filter element is to be arranged, the plurality of support elements having:
a first end arranged at the first flow face and on at least one of the flow face edges of the filter bellows;
an opposing second end, the second end forming a foot, the second end positioned outwardly away from the first end in a direction defined by the Z-axis, the foot configured to contact against the filter housing in which the filter element is to be arranged;
wherein the plurality of support elements project in the Z axis direction, outwardly away from the first flow face and away from the filter bellows.

18. The filter element according to claim 1, wherein the at least one support member further comprises:
a plug-in projection formed on the second end of the at least one support member;
an elastomeric foot member 42 secured on the plug-in projection;
wherein the plug-in projection is received into a recess in the elastomeric foot member.

19. The filter element according to claim 18, wherein the elastomeric foot member includes
an end face arranged at an opposite side of the elastomeric foot member relative to the recess;
at positioning receptacle formed as a second recess into the end face of the elastomeric foot member, such that when the filter element is installed, a respective positioning knob of the housing can engage into the positioning receptacle.

20. The filter element according to claim 1, wherein
at least some of the plurality of support elements lie directly on the at least one flow face edges of the filter bellows.

* * * * *